United States Patent
Koch et al.

(10) Patent No.: US 10,662,726 B2
(45) Date of Patent: May 26, 2020

(54) MIXING SYSTEM AND METHOD FOR PRODUCING A DRILLING FLUID FOR GROUND DRILLING AND USE IN PRODUCING A DRILLING FLUID FOR GROUND DRILLING

(71) Applicant: TRACTO-TECHNIK GmbH & Co. KG, Lennestadt (DE)

(72) Inventors: Elmar Koch, Eslohe (DE); Martin Köper, Attendorn (DE)

(73) Assignee: TRACTO-TECHNIK GMBH & CO. KG, Lennestadt (DE)

(*) Notice: Subject to any disclaimer, the term of this patent is extended or adjusted under 35 U.S.C. 154(b) by 0 days.

(21) Appl. No.: 16/011,027

(22) Filed: Jun. 18, 2018

(65) Prior Publication Data

US 2018/0371853 A1 Dec. 27, 2018

(30) Foreign Application Priority Data

Jun. 21, 2017 (DE) .................. 10 2017 005 798

(51) Int. Cl.
| | | |
|---|---|---|
| E21B 43/12 | (2006.01) | |
| C09K 8/24 | (2006.01) | |
| E21B 21/06 | (2006.01) | |
| B01F 15/02 | (2006.01) | |
| B01F 3/12 | (2006.01) | |
| B01F 7/02 | (2006.01) | |
| E21B 7/00 | (2006.01) | |
| E21B 7/04 | (2006.01) | |

(52) U.S. Cl.
CPC .......... *E21B 21/062* (2013.01); *B01F 3/1221* (2013.01); *B01F 7/02* (2013.01); *B01F 15/026* (2013.01); *B01F 15/0251* (2013.01); *C09K 8/24* (2013.01); *E21B 7/005* (2013.01); *E21B 7/046* (2013.01); *E21B 43/12* (2013.01); *B01F 2003/1257* (2013.01); *B01F 2015/0221* (2013.01)

(58) Field of Classification Search
None
See application file for complete search history.

(56) References Cited

U.S. PATENT DOCUMENTS

| | | | |
|---|---|---|---|
| 4,444,277 A | | 4/1984 | Lewis |
| 5,190,374 A | * | 3/1993 | Harms ............... B01F 5/205 366/165.2 |
| 5,213,414 A | * | 5/1993 | Richard ............... B01F 7/08 366/27 |

(Continued)

FOREIGN PATENT DOCUMENTS

| | | |
|---|---|---|
| AT | 515881 A1 | 12/2015 |
| CN | 104209051 B | 12/2014 |
| CN | 204933372 U | 1/2016 |

(Continued)

*Primary Examiner* — Matthew R Buck
*Assistant Examiner* — Douglas S Wood
(74) *Attorney, Agent, or Firm* — Howard IP Law Group, PC

(57) ABSTRACT

A mixing system for producing a drilling fluid for ground drilling includes a feed for a powdered medium and a mixing chamber with a feed for a fluid medium. A space is provided between the feed for the powdered medium and the mixing chamber, having sliding elements therein, which sliding elements can seal off the space at one end.

20 Claims, 1 Drawing Sheet

(56) References Cited

U.S. PATENT DOCUMENTS

| | | | |
|---|---|---|---|
| 7,575,071 B2* | 8/2009 | Schauerte | B01F 3/1214 |
| | | | 175/206 |
| 7,987,928 B2* | 8/2011 | Vuyk, Jr. | E21B 7/16 |
| | | | 166/75.15 |

FOREIGN PATENT DOCUMENTS

| | | |
|---|---|---|
| DE | 19918775 A1 | 4/2000 |
| GB | 451110 A | 7/1936 |
| GB | 2446956 A | 8/2008 |

* cited by examiner

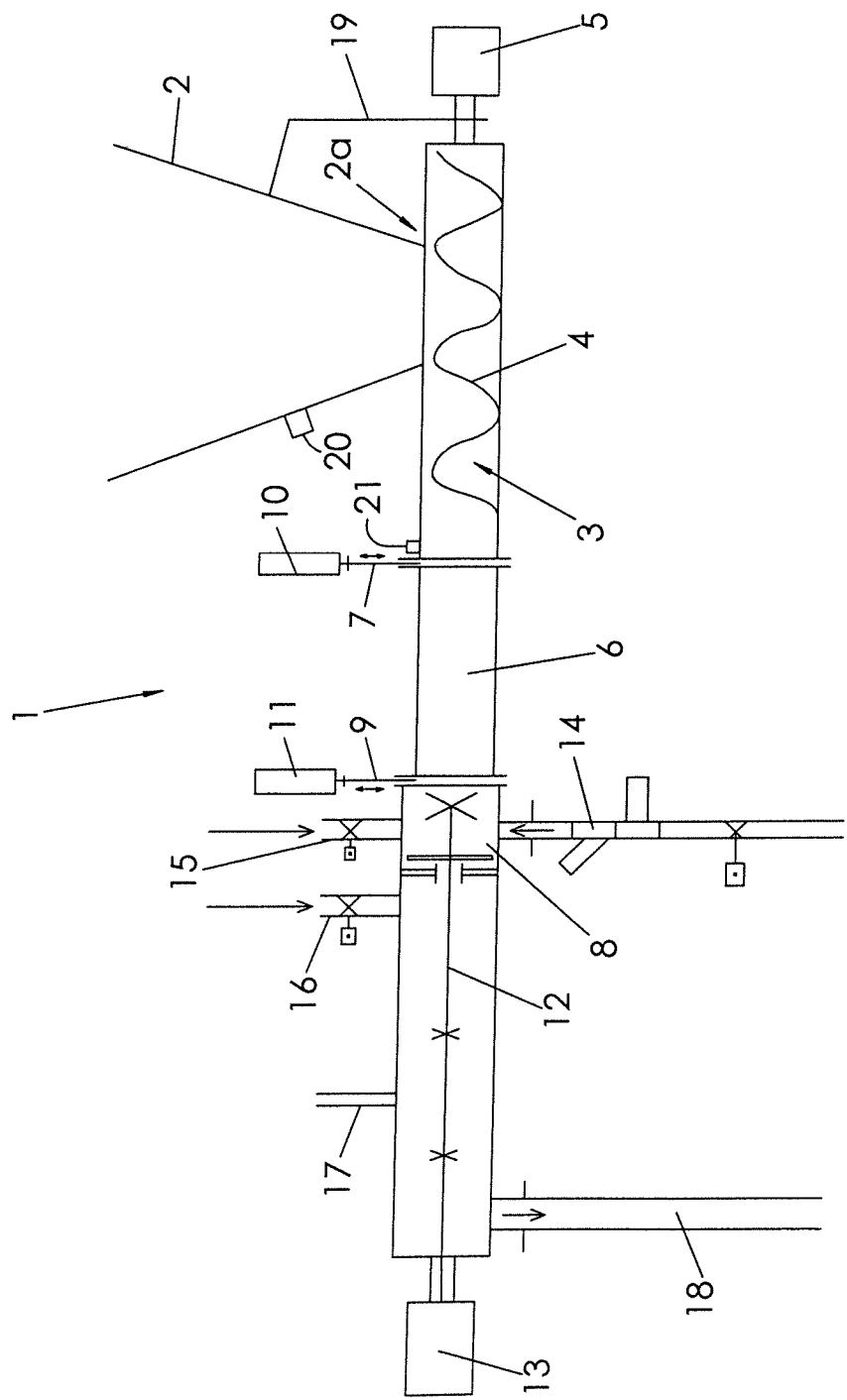

MIXING SYSTEM AND METHOD FOR PRODUCING A DRILLING FLUID FOR GROUND DRILLING AND USE IN PRODUCING A DRILLING FLUID FOR GROUND DRILLING

CROSS-REFERENCE TO RELATED APPLICATIONS

This application claims priority pursuant to 35 U.S.C. 119(a)-(d) to German Patent Application No. 10 2017 005 798.2 filed Jun. 21, 2017, the entire contents of which are incorporated herein by reference for all purposes.

FIELD OF THE INVENTION

The invention relates to a mixing system for producing a drilling fluid for ground drilling and a method for producing a drilling fluid for ground drilling. Furthermore, the invention relates to a use in producing a drilling fluid for ground drilling.

BACKGROUND

In ground drilling, in particular in horizontal drilling, an improvement and facilitation of the drilling operation are achieved with the help of drilling fluid and/or mud that are supplied to the drilling device and emerge in the area of the drilling head, for example, and are thereby introduced into the borehole, so that the soil can be softened and the drilling cuttings can be transported away. The cutting action of the drilling head can be improved. In addition, the drilling fluid can serve to lubricate the drilling head and the drill rods driven to rotate when drilling, and consequently, to reduce friction with the ground.

A mixture of water and a mineral, in particular bentonite, and optionally a few additives, which may also be in the form of one or more minerals, is generally used as the drilling fluid or mud. Bentonite is a mixture of various clay minerals with montmorillonite (usually in an amount of 60% to 80%) being provided as the main ingredient. Concomitant minerals may include quartz, mica, feldspar, pyrite and also calcide in some cases. Because of the montmorillonite content, bentonite has a great water absorption and swelling capacity. Water into which a mineral, in particular bentonite, is stirred may have thixotropic behavior. In other words, it may behave essentially like a fluid when in motion but essentially like a solid when at rest. Because of this property, a drilling fluid consisting of water and a mineral, in particular bentonite, may also be used to support the borehole wall, so that a collapse can be prevented.

The drilling fluid is usually prepared in advance and brought to the site of use in large tanks.

DE 199 18 775 B4 describes a continuous mixing system and a method for preparing a drilling fluid, in which a high-pressure pump is provided, having a connection for process water. Furthermore, there is also a connection for a feed medium, which is situated upstream from the high-pressure pump in the direction of flow, so that the feed medium is supplied to the high-pressure pump essentially in an unswollen form. This permits simplified charging of a drilling system with a drilling fluid.

It has been found that there is a demand for producing only as much drilling fluid as needed or to try to use a mixing system and a method as well as a use, which have been optimized for mixing quantities suitable to meet the demand and/or to permit a simplified use, specifically for producing the required amounts and/or facilitate an improvement in the required drilling fluid.

SUMMARY

The object of the invention is therefore to create an improved mixing system and an improved method for preparing a drilling fluid for ground drilling and an improved use in producing a drilling fluid for ground drilling, which will permit and/or provide user-friendly operation for obtaining an improved drilling fluid.

This object is achieved by the subject matter disclosed herein. Advantageous refinements of the subject matter are also disclosed herein.

The core of the invention is that the fluid medium and powdered medium are mixed in a controlled manner by reducing external influences on the powdered medium, in particular due to the fact that regions are provided in which external influences, such as atmospheric humidity, are reduced, and these regions are sealed off at least temporarily and partially. A space provided between the feed for the powdered medium and the mixing chamber is made available, and there are sliding elements capable of sealing off the space at the end. The space from the feed for the powdered medium and/or the mixing chamber can optionally be closed off by means of the sliding elements. Favorable conditions for various phases of production can be established by this at least temporary separation. For example, favorable conditions for startup of the mixing system, continuous production of the drilling fluid and termination of production of the drilling fluid can be taken into account. By means of the space and the sliding elements, it is possible to create a transition between the feed for the powdered medium and the feed for the fluid medium in the manner of a sluice. It is possible to use a system that is closed in at least some parts. Regulable forced mixing is possible. A high bandwidth of mixing ratios can be achieved. Furthermore, a supply of polymer and thorough mixing with same are also possible.

The user may obtain an added value for preparing a drilling fluid on demand and/or achieving an improvement in the individual phases in such preparation.

The invention creates a mixing system for preparing a drilling fluid for ground drilling with a feed for a powdered medium and a mixing chamber with a feed for a fluid medium. A space is provided between the feed for the powdered medium and the mixing chamber, and sliding elements are present, which can selectively close off the space at one end.

The term "drilling fluid" in the sense of the description is a mixture of a fluid medium, in particular a fluid, in particular water, and at least one powdered medium, in particular a mineral, in particular bentonite, and optionally one or more additives, which may be a fluid and/or a solid. The term "drilling fluid" also includes a rinsing fluid, i.e., mud, and the term "fluid" does not preclude a gaseous component.

The term "ground drilling" in the sense of the invention comprises an operation and/or a result of same, which is carried out or created by a ground drilling device, wherein a ground drilling device is understood in particular to be a device that may use a drill rod and may have short lengths of drill rods, such that the device moves the drill rods in an existing passage in the ground to create or widen the earth borehole, in particular a horizontal drilling (HD), or to extend pipelines or other long bodies (for example, pipes) into the ground. The ground drilling device may be an HD device in particular. A ground drilling device includes a device that drives a drill rod, which works to displace ground area and introduces the drill rod into the ground by rotation and/or translation in the longitudinal axial direction of the drill rod.

A "drill rod" in the sense of the description includes in particular a drill string having drill rods.

The term "HD" (horizontal drilling) in the sense of the description includes in particular any type of existing conduit or passage or one to be created, preferably horizontally, in particular ground drillings for underground or aboveground pipelines and water conduits, which can be produced or created by using a corresponding ground drilling device.

The term "ground" or "earth" includes the earth's crust in any form, including sand, soil as well as solid or loose rock.

The term "mixing system" in the sense of the description includes a system in which a powdered medium and a fluid medium can be mixed.

The term "powdered medium" in the sense of the description includes a solid used to produce a drilling fluid, in particular a mineral, most especially preferably bentonite.

The term "fluid medium" includes in the sense of the description a fluid, which is used to produce a drilling fluid, in particular a fluid containing a large amount of water, in particular preferably water—optionally with possible impurities.

The term "space" in the sense of the description includes an at least partially enclosed portion of the mixing system. The space may have any geometry. The space preferably has a longitudinal extent, which is aligned in the direction of the connection between the mixing chamber and the feed for the powdered medium, and which represents an extension of the mixing chamber and the space with the feed for the powdered medium (feed space). The space, the mixing chamber and the space with the feed for the powdered medium may all be on one axis.

The term "slide" or "sliding element" in the sense of the description includes any element with which a stream of substance is possible between the space and the feed for a powdered medium and/or the mixing chamber. The "slide" may be a valve. With this "slide" it is selectively possible to prevent passage between the space and the mixing chamber and/or the space and the feed of the powdered medium. The area with the feed for the powdered medium may be closed off, wherein additionally or alternatively, the mixing chamber may be closed off. The sliding element(s) may be driven electrically and/or electronically, hydraulically and/or pneumatically, to operate the mixing system automatically.

In a preferred embodiment, the feed for the fluid medium is arranged in the end region of the mixing chamber toward the space. The entrance and/or the feed of the fluid medium into the mixing chamber is/are therefore arranged, so that the fluid medium can be presented in the area to the space. The fluid medium thereby introduced may thus be applied directly to the space, i.e., it may be present in the space without any significant distance to travel.

In a preferred embodiment, a sensor is provided in the end region of the space for the feed for the powdered medium. Due to the fact that a sensor can be arranged in the end region of the space, which is directed toward the feed of powdered medium, it is possible to detect whether there is enough powdered medium in the space and/or whether the medium applied in the space is sufficiently powdered and/or has been transported there before the feed for the powdered medium. It is possible in this way to ascertain whether there are conditions which will enable another phase or an additional phase, which are desired in operation and/or in mixing, to be carried out. The sensor may be arranged in particular in front of the slide outside of the space in order to detect whether powdered medium is applied to the space in a sufficient amount.

In a preferred embodiment, a feed for fluid medium mixed or combined with powdered medium is provided on the mixing chamber. In this way, for example, it is possible to introduce drilling fluid that has already been prepared into the mixing chamber. It is also possible that a recycled drilling fluid can be flushed back into the mixing chamber. This also permits a simplified tie-in to a mixing and recycling concept.

Alternatively, or additionally, in the preferred embodiment, a feed for a polymer may be provided on the mixing chamber, so that the drilling fluid can be mixed with a polymer and/or a polymer may be added to the drilling fluid.

The invention also achieves a method for producing a drilling fluid for ground drilling, wherein a powdered medium is mixed with a fluid medium. This method includes the step of providing a space between a feed for the powdered medium and a mixing chamber having a feed for the fluid medium, such that the space is closed off and opened by means of two sliding elements.

It is possible in this way to respond to the individual phases of production and/or retrieval of the drilling fluid by the ground drilling device and partitioning of individual regions, in which a cutoff with respect to external influences or influences of other regions of the mixing system is reduced at least temporarily and partially.

In a preferred embodiment, a powdered medium is introduced into the space by means of a conveyor screw. The use of a conveyor screw offers the advantage of using a stable component, which can also permit dosing. The conveyor screw may also be arranged outside of the space, in which case the conveyor screw conveys the powdered medium into the space.

In a preferred embodiment, a mixer is driven to rotate in the mixing chamber, so that a good mixing effect of fluid medium and powdered medium supplied through the space is possible. Turbulence is also possible by means of the mixer. In a particularly preferred embodiment, the speed of the mixer can be regulated and/or is independent of the shaft of the feed screw. Shearing disks may be arranged which can additionally ensure a good and thorough mixing of the powdered medium and the fluid medium in the forward and/or rear regions of the mixer. A rinsing flow can be established by the external pressure of the fluid medium supplied.

In a preferred embodiment, the fluid medium is supplied at a pressure of less than 5 bar, in particular less than 4 bar, especially preferably less than 3 bar. It is therefore not necessary to have a high-performance pump in this region. At least in this region, no pump is necessary to supply a high pressure, so that thorough mixing is simplified and is possible without any great effort or the high costs associated therewith.

In a preferred embodiment, the sliding element is first connected between the mixing chamber and the space in one step at the beginning, and the space is filled with powdered medium. It is possible in this way to enable a phase of startup, i.e., beginning the mixing, in which the powdered medium to be mixed is already present in the space in a sufficient amount.

In a preferred embodiment, in supplying a ground drilling device with drilling fluid, first the sliding element to the mixing chamber is closed, the powdered medium is supplied rapidly while the sliding element at the feed for supplying powdered medium is open, and on reaching a predetermined amount of powdered medium, the sliding element to the mixing chamber between the supply and the chamber is opened, so that the subsequent supply of powdered medium is carried out more slowly, i.e., the feed screw is operated first at a high rotational speed and then at a lower rotational speed. This makes it possible for a powdered medium to be applied rapidly at first, wherein the subsequent mixing itself need not be carried out at a high rate of feed. Drives for this need not be dimensioned in a large size and may also have a simpler design. Service and maintenance as well as repairs of a feed screw that is operated slowly can be reduced in comparison with a feed screw that is always driven at a high speed, so the lifetime of such a feed screw can be increased.

The invention also creates a use in production of a drilling fluid for ground drilling, wherein a powdered medium is mixed with a fluid medium and a space that is situated between a feed for the powdered medium and a mixing chamber having a feed for the fluid medium is used. This space is selectively closed off and opened by using two sliding elements.

The invention also relates to a system comprising a mixing system and a ground drilling device.

Details in the description of the mixing system, the method and use should be understood to be supplementary to one another. The aspects of the mixing system as they pertain to the device may also be interpreted as steps of the process and vice versa. The activities performed on the device correlate with process steps for a process that is described. Similarly, aspects of use can be derived from the aspects pertaining to the device and/or the process steps of the mixing system.

The statements made above as well as the following description of exemplary embodiments do not constitute a renunciation of certain embodiments or features.

BRIEF DESCRIPTION OF THE DRAWING

The invention is described in greater detail below on the basis of an exemplary embodiment, which is illustrated in the drawing.

FIG. 1 shows a schematic diagram of a mixing system.

DETAILED DESCRIPTION

FIG. 1 shows a schematic diagram of a mixing system 1. A supply tank 2 in which bentonite can be stored is provided. A feed 2a into a feed space 3, where a feed screw 4 is situated, is provided on the end of the supply tank 2. The feed space 3 is designed in a tubular shape. The outside diameter of the feed screw 4 corresponds essentially to the inside diameter of the feed space 3. The feed of the powdered medium and/or the end of the supply tank 2 is/are connected to the outer pipe of the feed screw 4. The feed screw 4 is connected to a drive 5, with which the feed screw 4 can be driven.

The feed space 3 may be in fluid connection to a space 6, wherein the connection between the feed space 3 and the space 6 can be interrupted by means of a sliding element 7. The space is designed in a tubular shape and has essentially the same diameter as the feed space 3. The space 6 is an extension of the feed space 3. The central axis of the space 6 is essentially on the central axis of the feed space 3.

The fluid connection between the feed space 3 and the space 6 is selectively separable by means of the sliding element 7. When the sliding element 7 is open, powdered medium can be conveyed into the space 6 and subsequently into a mixing chamber 8 by means of the feed screw 4.

A sliding element 9, with which the connection between the space 6 and the mixing chamber 8 can selectively be interrupted, is also provided between the mixing chamber 8 and the space 6. The sliding elements 7, 9 may selectively be brought into a closed position or an open position. Independent movement of the sliding elements 7, 9 is possible. The sliding elements 7, 9 can be moved by means of an electrical or electronic drive 10 and/or 11, respectively.

The mixing chamber 8 is designed in the form of a tube. The mixing chamber 8 is an extension of the space 6. The central axes of the mixing chamber 8 and the feed chamber 3 essentially coincide.

A mixer 12 is arranged in the mixing chamber 8. The mixer 12 is arranged in the mixing chamber 8 in such a way that the mixer 12 is provided for rotating at the center of the mixing chamber 12 by means of a drive 13 at the center. The axis of the mixing chamber 12 corresponds essentially to the central axis of the mixing chamber 8. The rotational speed of the mixer 12 is adjustable independently of the rotational speed of the feed screw 4.

The mixing chamber 8 is provided with a feed for fluid medium. Furthermore, a feed 15 for drilling fluid 15 that is already present is provided on the mixing chamber 8. Another feed 16 for a fluid medium, for example, recycled drilling fluid, is also present.

A feed 17 for a polymer is provided in the rear area of the mixing chamber 8.

The mixture of powdered medium and fluid medium can be discharged from the mixing system 1 through a drain 18.

To empty the supply tank 2, an agitator 19, which may have a belt drive, is provided. The belt drive may be connected to the drive 5.

A sensor 20, which can monitor the filling level of the supply tank 2 with regard to the powdered medium, is provided on the supply tank 2. A sensor 21 for powdered medium, which is provided at the end of the feed space 3, can verify whether and how much powdered medium, i.e., whether there is enough powdered medium in the feed space 3.

Operation of the mixing system 1 is as follows:

For startup of the mixing system 1, the sliding element 9 may be closed, and the sliding element 7 may be opened. The feed 14 for the fluid medium may be opened, and the drive 5 of the feed screw 4 is started when the sensor 21 signals that enough powdered medium is present in the transition between the feed space 3 and the space 6. Then the sliding element 9 is opened and the drive 13 of the mixer 12 is turned on. Preparation of drilling fluid may begin by means of the procedure described here to prepare the mixing system.

In further preparation of drilling fluid, the sliding element 9 is first closed and the sliding element 7 is opened, so that the drive 5 for the feed screw 4 is rotated at a high rotational speed until the sensor 21 indicates that enough powdered medium is present, i.e., the space 6 has been filled to a sufficient extent. The sliding element 9 then opens and the drive 5 of the feed screw 4 is set at a lower rotational speed.

The ground drilling is stopped and/or the mixing of drilling fluid is stopped by closing the sliding element 7 and stopping the drive 5 for the feed screw 4. The sliding element 9 is open and the drive 13 of the mixer 12 is turned on. The mixing chamber 8 can then be emptied.

The invention claimed is:

1. A mixing system for preparing a drilling fluid for ground drilling comprising:

a powdered medium feed in communication with a powdered medium feed space;
a fluid medium feed in communication with a mixing chamber including a mixer configured to mix the powdered medium and the fluid medium into a thixotropic drilling fluid; and
a space chamber in communication with the powdered medium feed space and the mixing chamber,
wherein the space chamber includes a first sliding element at a first end of the space chamber which is configured to close off the space chamber from the mixing chamber and a second sliding element at a second end of the space chamber which is configured to close off the space chamber from the powdered medium feed space.

2. The mixing system according to claim 1, wherein the fluid medium feed is arranged at an end of the mixing chamber in communication with the space chamber.

3. The mixing system according to claim 1, further comprising a sensor arranged at the second end of the space chamber adjacent to the powdered medium feed space.

4. The mixing system according to claim 1, further comprising one of a mixed feed for fluid medium mixed with powdered medium in communication with the mixing chamber and a polymer feed in communication with the mixing chamber.

5. The mixing system of claim 1, wherein the space chamber and the powdered medium feed space are tubular and wherein the space chamber and the powdered medium feed space have a common central axis.

6. The mixing system of claim 5, wherein the space chamber and the powdered medium feed space have a substantially similar diameter.

7. The mixing system of claim 5, wherein the mixing chamber is tubular and has the common central axis with the space chamber and the powdered medium feed space.

8. The mixing system of claim 1, further comprising a feed screw arranged within the powdered medium feed space and operatively connected to a feed screw drive.

9. The mixing system of claim 1, wherein the first sliding element and the second sliding element are configured to be operated separately.

10. The mixing system of claim 1, further comprising at least one sliding element drive configured to open and close at least one of the first sliding element and the second sliding element.

11. The mixing system of claim 1, further comprising a mixer arranged within the mixing chamber and operatively connected to a mixing drive.

12. The mixing system of claim 1, further comprising a drilling fluid feed in communication with the mixing chamber.

13. The mixing system of claim 1, further comprising a recycled drilling fluid feed in communication with the mixing chamber.

14. A method for ground drilling, comprising:
providing a powdered medium to a powdered medium feed space by a powdered medium feed in communication with the powdered medium feed space;
providing a fluid medium to a mixing chamber by a fluid medium feed in communication with the mixing chamber;
providing a space chamber between the powdered medium feed space and the mixing chamber, wherein the space chamber includes a first sliding element at a first end of the space chamber adjacent to the mixing chamber and a second sliding element at a second end of the space chamber adjacent to the powdered medium feed space;
closing the first sliding element and opening the second sliding element;
opening the fluid medium feed to allow fluid medium to be introduced to the mixing chamber;
opening the powdered medium feed to allow the powdered medium to be introduced to the powdered medium feed space and the space chamber until a sufficient quantity of the powdered medium is present within the powdered medium feed space and the space chamber;
opening the first sliding element; and
driving a mixer within the mixing chamber to mix the fluid medium with the powdered medium to create a thixotropic drilling fluid.

15. The method according to claim 14, wherein the powdered medium is introduced into the powdered medium feed space by a feed screw arranged within the powdered medium feed space.

16. The method according to claim 14, wherein mixer is driven with a mixer drive to rotate in the mixing chamber.

17. The method according to claim 14, wherein the fluid medium is introduced to the mixing chamber at a pressure below 3 bar.

18. The method according to claim 15, further comprising, after opening the powdered medium feed to allow the powdered medium to be introduced to the powdered medium feed space and the space chamber, rotating the feed screw at a high rotational speed until a predetermined amount of powdered medium is introduced to the powdered medium feed space and the space chamber.

19. The method according to claim 14, further comprising, after the sufficient quantity of the powdered medium is present within the powdered medium feed space and the space chamber, closing the second sliding element.

20. The method of claim 14, further comprising determining whether there is the sufficient quantity of the powdered medium is present within the powdered medium feed space and the space chamber by a sensor in the powdered medium feed space.

* * * * *